(12) United States Patent
Richtarsky et al.

(10) Patent No.: US 10,831,810 B2
(45) Date of Patent: Nov. 10, 2020

(54) FIXED STRING DICTIONARY

(71) Applicants: Martin Richtarsky, Bad Schoenborn (DE); Franz Faerber, Walldorf (DE); Juchang Lee, Seoul (KR); Ivan Schreter, Malsch (DE)

(72) Inventors: Martin Richtarsky, Bad Schoenborn (DE); Franz Faerber, Walldorf (DE); Juchang Lee, Seoul (KR); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 13/874,327

(22) Filed: Apr. 30, 2013

(65) Prior Publication Data
US 2014/0222418 A1  Aug. 7, 2014

Related U.S. Application Data

(60) Provisional application No. 61/640,689, filed on Apr. 30, 2012.

(51) Int. Cl.
*G06F 16/36* (2019.01)
*G06F 16/31* (2019.01)
*G06F 16/22* (2019.01)

(52) U.S. Cl.
CPC .......... *G06F 16/367* (2019.01); *G06F 16/22* (2019.01); *G06F 16/221* (2019.01);
(Continued)

(58) Field of Classification Search
CPC ......... G06F 17/30153; G06F 17/30598; G06F 17/30; G06F 17/30336; G06F 17/30339;
(Continued)

(56) References Cited

U.S. PATENT DOCUMENTS 5,204,958 A     4/1993  Cheng et al.
5,416,857 A *   5/1995  Chen ...................... G06T 9/005
                                                    348/401.1
(Continued)

FOREIGN PATENT DOCUMENTS

JP       2010539616 A      12/2010
JP       2011209807 A      10/2011
WO       WO-2011/144382 A1 11/2011

OTHER PUBLICATIONS

Bitmask-based Control Word Compression for NISC Architectures, Proceedings of the 19th ACM Great Lakes symposium on VLSI, 321-326 (May 10-12, 2009) (Year: 2009).*

(Continued)

*Primary Examiner* — Alford W Kindred
*Assistant Examiner* — Cecile H Vo
(74) *Attorney, Agent, or Firm* — Mintz Levin Cohn Ferris Glovsky and Popeo, P.C.

(57) ABSTRACT

The subject matter described herein relates to implementation of a dictionary in a column-based, in-memory database where values are not stored directly, rather, for each column, a dictionary is created with all distinct values. For each row, a reference to the corresponding value in the dictionary is stored. In one aspect, data is stored in a memory structure organized in a column store format defined by a plurality of columns and a plurality of rows. A dictionary for each column in the memory structure is generated. The dictionary has distinct values for each column. A reference to the dictionary is generated for each column in the memory structure. The dictionary and the reference to the dictionary are stored in the memory structure.

5 Claims, 9 Drawing Sheets

Position

(52) U.S. Cl.
CPC ........ *G06F 16/2228* (2019.01); *G06F 16/313*
(2019.01); *G06F 16/36* (2019.01)

(58) Field of Classification Search
CPC ........... G06F 17/30985; G06F 17/2735; G06F
17/3012; G06F 17/30286; G06F
17/30584; G06F 17/30705; G06F
17/30955; G06F 17/30324; G06F
12/0246; G06F 17/30271; G06F 21/64;
G06F 3/0619; G06F 9/30156; G06F
9/30178; G06F 9/322; G06F 9/3822;
G06F 16/367; G06F 16/22; G06F 16/221;
G06F 16/313; G06F 16/2228; G06F
16/36; H03M 7/3088; H03M 7/30
USPC ............. 707/693, 737, E17.054, 802, 999.1,
707/E17.039, E17.046, E17.051, E17.091,
707/687, 801, 803, 999.101, 999.003,
707/E17.014, E17.044, 792, E17.002,
707/790; 382/233, 166, 232, 237, 236;
386/248, 355
See application file for complete search history.

(56) References Cited

U.S. PATENT DOCUMENTS

| | | | |
|---|---|---|---|
| 5,790,857 A | 8/1998 | Clifford et al. | |
| 6,629,264 B1 | 9/2003 | Sicola et al. | |
| 6,845,375 B1 | 1/2005 | Sinclair | |
| 7,672,981 B1 | 3/2010 | Faibish et al. | |
| 7,868,789 B1* | 1/2011 | Binnig | G06F 16/24561 341/51 |
| 7,882,086 B1 | 2/2011 | Wang et al. | |
| 8,108,361 B2* | 1/2012 | Netz | H03M 7/30 707/687 |
| 8,359,316 B2* | 1/2013 | Franke | G06F 16/278 707/737 |
| 8,595,248 B2 | 11/2013 | Ganesh et al. | |
| 9,165,010 B2 | 10/2015 | Faerber et al. | |
| 9,171,020 B2 | 10/2015 | Faerber et al. | |
| 2002/0032018 A1 | 3/2002 | Morton et al. | |
| 2002/0072658 A1 | 6/2002 | Rice et al. | |
| 2005/0192998 A1* | 9/2005 | Dittrich | G06F 16/2228 |
| 2006/0155915 A1 | 7/2006 | Pereira | |
| 2006/0173833 A1 | 8/2006 | Purcell et al. | |
| 2009/0313309 A1 | 12/2009 | Becker et al. | |
| 2010/0223237 A1* | 9/2010 | Mishra | G06F 9/30178 707/693 |
| 2011/0016157 A1 | 1/2011 | Bear et al. | |
| 2011/0208940 A1 | 8/2011 | Naganuma et al. | |
| 2011/0274170 A1 | 11/2011 | Paz | |
| 2012/0072656 A1 | 3/2012 | Archak et al. | |
| 2012/0259809 A1 | 10/2012 | Hermann et al. | |
| 2013/0073530 A1* | 3/2013 | Faerber | H03M 7/3084 707/693 |
| 2013/0082991 A1 | 4/2013 | Lin | |

OTHER PUBLICATIONS

Bitmask-based Control Word Compression for NISC Architectures, Proceedings of the 19th ACM Great Lakes symposium on VLSI, 321-326 (May 10-12, 2009) (Year: 2009).*

"Test data compression using dictionaries with selective entries and fixed-length indices," ACM Transactions on Design Automation of Electronic Systems (TODAES), vol. 8(4), pp. 470-490, Oct. 2003 (Year: 2003).*

Extended European Search Report dated Sep. 27, 2013, issued by the European Patent Office for EP application No. 13002237.9.

Spillane et al. "An Efficient Multi-Tier Tablet Server Storage Architecture." *Cloud Computing*. ACM. New York. (Oct. 26, 2011):1-14.

Stonebraker. "Managing Persistent Objects in a Multi-Level Store." *Sigmod Record USA*. vol. 20. No. 2 (1991);2-11.

* cited by examiner

| CITY | REV |
|---|---|
| Walldorf | 100 |
| San Jose | 400 |
| Walldorf | 400 |

ROW 1
ROW 2
ROW 3

FIG. 1 (PRIOR ART)

FIXED STRING DICTIONARY

RELATED APPLICATION

This application claims priority to U.S. Patent Application Ser. No. 61/640,689 entitled "Fixed String Dictionary" filed on Apr. 30, 2012, the contents of which are hereby incorporated by reference.

TECHNICAL FIELD

The subject matter described herein relates to database management, and more particularly to systems and methods employing a fixed string dictionary for faster and more efficient data access.

BACKGROUND

An in-memory database system is a database system that primarily uses main memory for data storage. One example of an in-memory database system is the HANA in-memory database system provided by SAP AG of Walldorf Germany. As opposed to employing a disk storage mechanism for storing business data, in-memory database systems such as HANA use main memory, which is faster than disk-based databases since storage, access and retrieval functions execute far fewer CPU instructions. Accessing data in main memory reduces the input/output reading activity when querying the data, which in turn provides faster and more predictable performance than disk.

Traditional databases are row-based, and for each row, the size of the row in bytes is known and needs to be set aside for storage. For example, the instruction:

Create Table T (City Char (10), Revenue Integer)

Each row will require 10+4 bytes of storage (INTEGER requires 4 byte), and rows with identical values will still require 10+4 bytes per row. Accordingly, a storage estimate is 14 bytes per row, and 42 bytes total, for storing 3 rows. One challenge is to represent the data with small memory consumption, because memory is costly, and less storage means faster access (less memory bus bandwidth).

SUMMARY

The current subject matter relates to implementation of a dictionary in a column-based, in-memory database where values are not stored directly, rather, for each column, a dictionary is created with all distinct values. For each row, a reference to the corresponding value in the dictionary is stored.

In one aspect, data is stored in a memory structure organized in a column store format defined by a plurality of columns and a plurality of rows. A dictionary for each column in the memory structure is generated. The dictionary has distinct values for each column. A reference to the dictionary is generated for each column in the memory structure. The dictionary and the reference to the dictionary are stored in the memory structure.

In some variations, one or more of the following can be additionally implemented individually or in any feasible combination. A block of memory is defined for each dictionary. The block of memory is compressed for each dictionary. The block includes a reference term, a bitvector representing a character position in each dictionary, a reference to a dictionary for all non-constant character positions, and a bit array having bitstrings of all coded terms associated with non-constant characters in a group of dictionaries. Further, a dictionary is built/constructed/generated for all positions in the block other than the reference term.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 1 illustrates a prior art dictionary for a traditional row-based database;

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide high compression and yet fast search on certain types of data, which is relevant for key columns and many data columns in a business warehouse, enterprise resource planning (BW/ERP) system.

FIG. 1 illustrates a prior art dictionary for a traditional row-based database.

Figure 2:
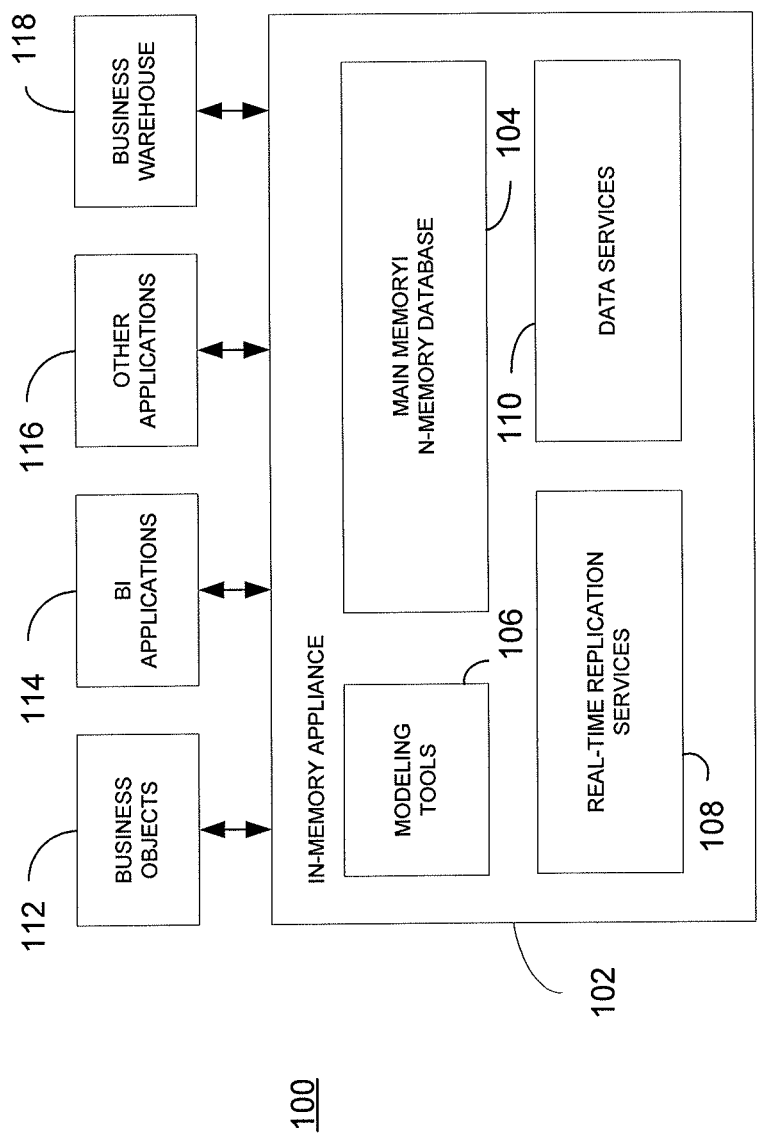
FIG. 2 illustrates a block diagram of an in-memory database system (IMDS) that includes an in-memory appliance having a main memory that forms an in-memory database having a column and/or row structure, for fast storage, access and retrieval of business data.

FIG. 2 is a block diagram of an in-memory database system (IMDS) 100 that includes an in-memory appliance 102 having a main memory 104 that forms an in-memory database having a column and/or row structure, for fast storage, access and retrieval of business data. The main memory can be provided in silicon, such as random access memory. The in-memory appliance 102 of the IMDS 100 also includes modeling tools 106 for modeling any number of applications or visualizations of the data from the main memory 104, i.e. executing various business applications or the like, real-time replication services 108 and data services 110 for the business data received for storage by the in-memory appliance 102.

The in-memory appliance 102 can be a computing system such as a server, or a set of computing system distributed across a network. The in-memory appliance 102 receives data for storage according to one or more business objects 112, which can be retrieved and used by one or more business intelligence (BI) applications 114 or other applications 116. Other consumers of business data from the in-memory appliance 102 can be a business warehouse 118 or similar application framework.

Figure 3:
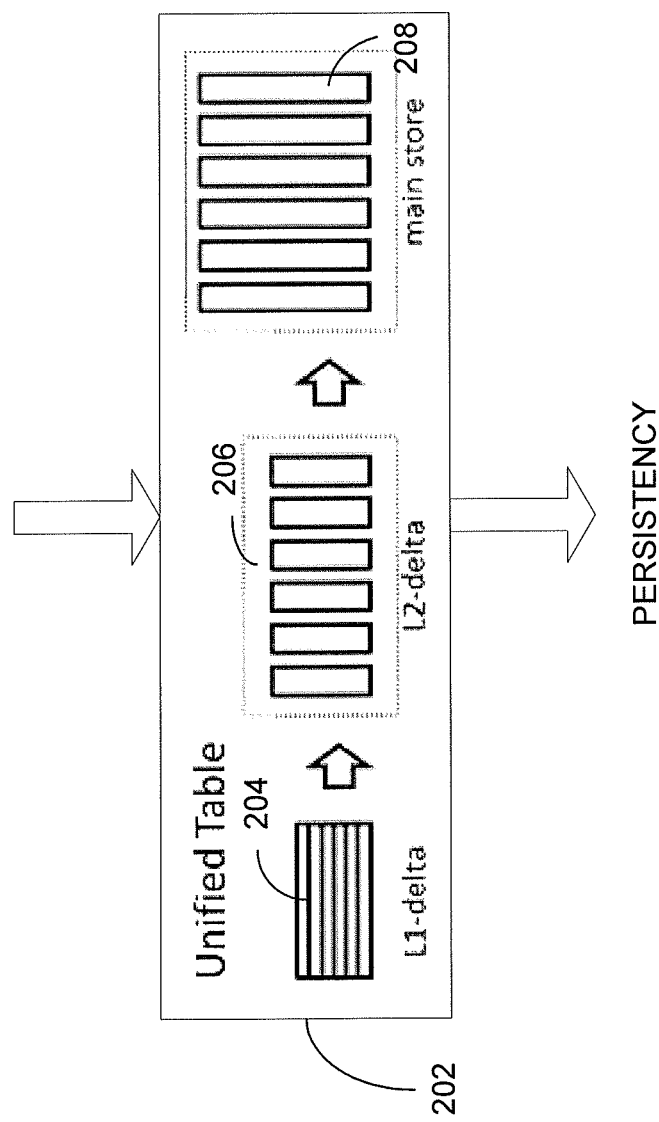
FIG. 3 is a diagram illustrating aspects of a system showing features consistent with implementations of the current subject matter.

FIG. 3 illustrates a storage structure 200 that can be used with an in-memory database according to implementations of an LOB storage scheme. The storage structure includes a unified table structure 202 having a row store structures 204 for storing, as an example, level 1 delta data based on operations executed according to a number of physical operators. The unified table structure 202 can include column store structures 206 and 208, for storing level 2 data and main memory storage, respectively. A typical setup of the storage structure 200 includes the following three stages for records within a regular table.

L1-delta: The L1-delta structure accepts all incoming data requests and stores them in a write-optimized manner, i.e. the L1-delta preserves the logical row format of the record. The data structure is optimized for fast insert and delete, field update, and record projection. Moreover, the L1-delta structure does not perform any data compression. As a rule of thumb, the L1-delta structure may hold 10,000 to 100,000 rows per single-node database instance depending on the workload characteristics and the amount of available memory.

L2-delta: The L2-delta structure represents the second stage of the record life cycle and is organized in the column store format. In contrast to the L1-delta, the L2-delta employs dictionary encoding to achieve better memory usage. However, for performance reasons, the dictionary is unsorted requiring secondary index structures to optimally support point query access patterns, e.g. fast execution of unique constraint checks. The L2-delta is well suited to store up to 10 millions of rows.

Main Store: The main store represents the core data format with the highest compression rate, exploiting a variety of different compression schemes. By default, all values within a column are represented via the position in a sorted dictionary and stored in a bit-packed manner to have a tight packing of the individual values. While the dictionary is always compressed using a variety of prefix-coding schemes, a combination of different compression techniques—ranging from simple The different data structures share a set of common data types. The access is exposed through a common abstract interface with row and column iterator, both optionally dictionary based. Moreover, some of the physical operators may pull record-by-record or in a vectorized way (i.e. block-by-block) following a classical ONC-protocol to enable pipelined operation and reduce the memory requirements for intermediate results as much as possible. Other physical operators can implement a "materialize all"—strategy to avoid operator switching costs during query execution. The optimizer decides on a mixture of the different types of operators depending on the logical calculation model, i.e. the different types of operators are seamlessly integrated within a final query execution plan.

For the operators leveraging sorted dictionaries, the unified table access interface also exposes the table content via a global sorted dictionary. Dictionaries of two delta structures are computed (only for L1-delta) and sorted (for both L1-delta and L2-delta) and merged with the main dictionary on the fly. In order to implement efficient validations of uniqueness constraints, the unified table provides inverted indexes for the delta and main structures.

The record life cycle is organized in a way to asynchronously propagate individual records through the system without interfering with currently running database operations within their transactional sphere of control. The database system provides two transformations, called "merge steps":

L1-to-L2-delta Merge: FIG. 3 further illustrates this merge operation. The transformation from L1-delta to L2-delta uses a pivoting step from row to column organization. Rows of the L1-delta are split into their corresponding columnar values and column-by-column inserted into the L2-delta structure. At the receiving side, the system performs a lookup to identify potentially missing values in the dictionary structure and optionally inserts new entries at the end of the dictionary to avoid any major restructuring operations within the dictionary. In the second step, the corresponding column values are added to the value vector using the dictionary encodings (append-only structure). Both steps can be performed in parallel, because the number of tuples to be moved is known in advance enabling the reservation of encodings in the new dictionary before actually inserting them. In a third step, the propagated entries are removed from the L1-delta. All running operations either see the full L1-delta and the old end-of-delta border or the truncated version of the L1-delta structure with the expanded version of the L2-delta. The transition from L1-delta to L2-delta is incremental in nature, i.e. the transition of records does not have any impact in terms of reorganizing the data of the target structure.

Figure 4:
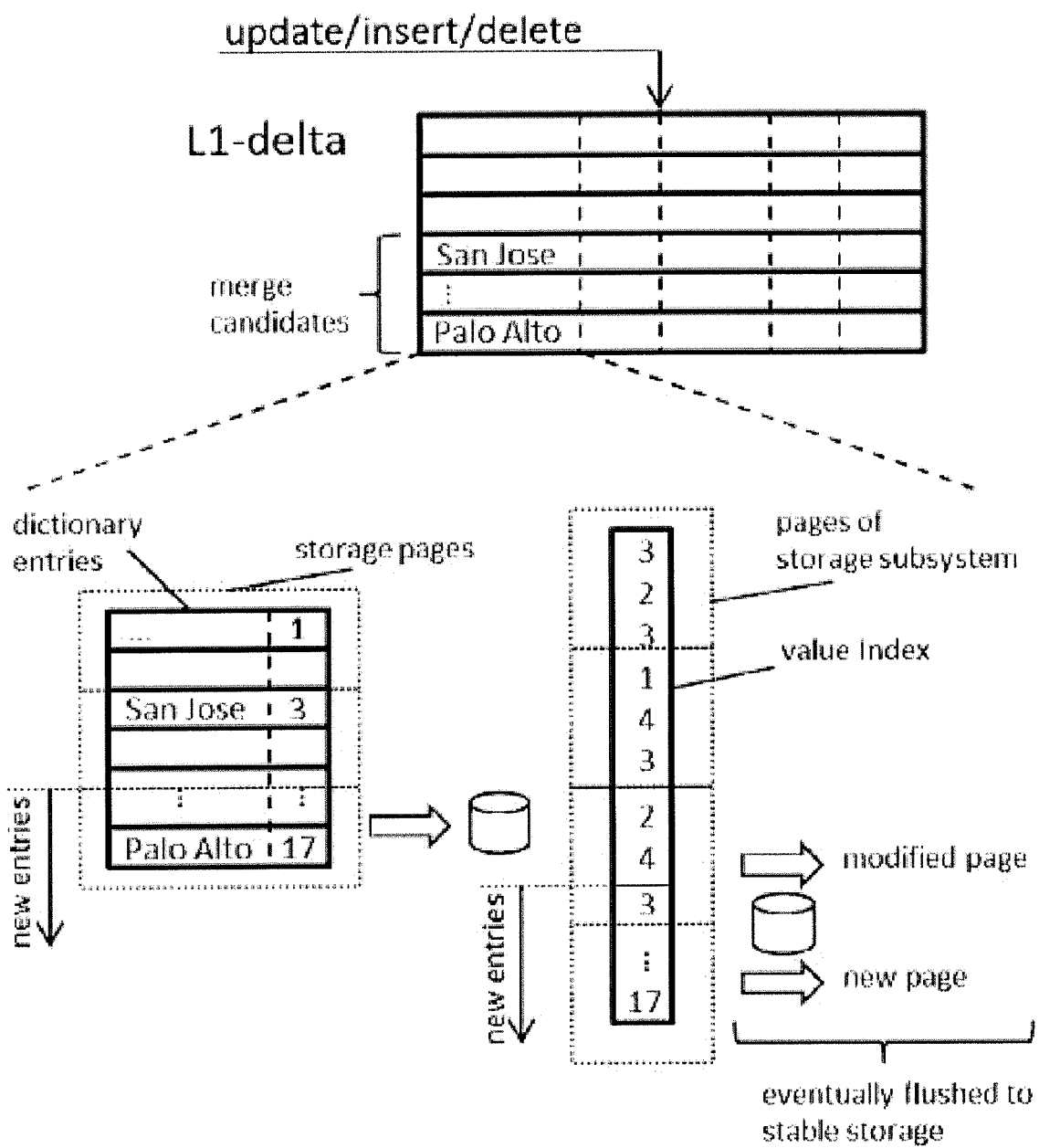
FIG. 4 illustrates a storage structure for use with a system in accordance with implementations of the current subject matter.

L2-delta-to-main Merge: FIG. 4 illustrates this merge operation. A new main structure is created out of the L2-delta and the existing main. While the L1-to-L2-delta Merge is minimally invasive with respect to running transactions, a L2-delta-to-main merge is a resource-intensive task which has to be carefully scheduled and highly optimized on a physical level. As soon as a L2-delta-to-main merge is started, the current L2-delta is closed for updates and a new empty L2-delta structure is created serving as the new target for the L1-to-L2-delta merge. If a merge fails, the system still operates with the new L2-delta and retries the merge with the previous versions of L2-delta and main. Section 4 will detail the core algorithms and give some more details of different optimization techniques such as column-wise or partial merge.

In preferred implementations, the dictionary consists of fixed strings. The dictionary can be implemented depending on the data stored: either the dictionary with a special compression is chosen (i.e., when the data allows it), or a "standard" dictionary is used. The special-compression dictionary also includes an optimized search capability as a binary search on bitcoded data, and uses special central processing unit (CPU) instructions to efficiently perform the compression.

The dictionary stores a list of strings which are sorted, i.e. AAA, ABC, ABB, ABC. This special dictionary is only used when all the strings have the same length (here, length 3). In this case, for each column position a "mini dictionary" is built containing the distinct values at that position:

Position 0: [A]
Position 1: [A, B]
Position 2: [A, B, C]

The strings are then coded using these dictionaries. While for the original string exactly 1 byte was needed for each character, this changes when using the new "mini" dictionaries: the first character of each string can be omitted, since it is the same for all strings—it needs to be stored in the mini dictionary only; and the second character in each string (position 1) only has two distinct values. These can be coded with 1 bit only. Also, the third character can be stored with 2 bits, which can lead to substantial savings.

Figure 5:
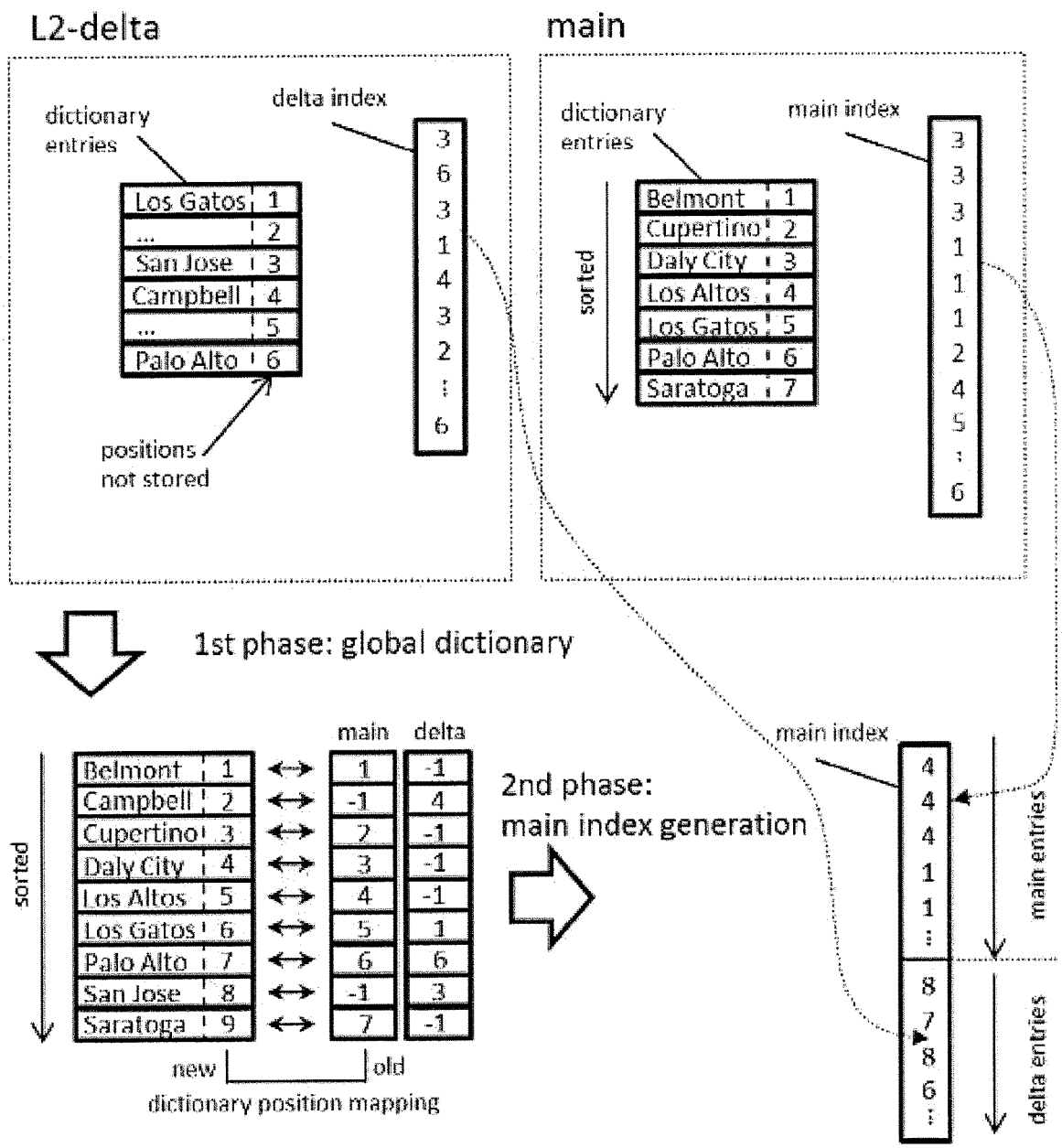
FIG. 5 illustrates a delta merge operation.

As noted herein, FIG. 5 illustrates a delta merge operation.

Figure 6:
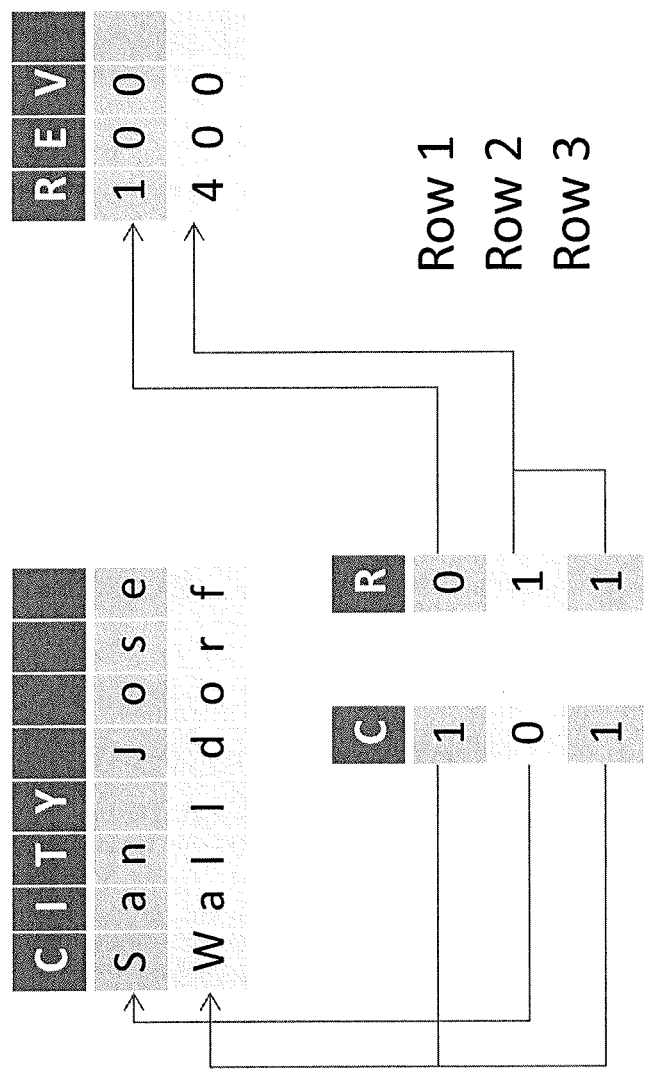
FIG. 6 illustrates a delta to main memory merge operation.

In implementations of the present subject matter, values are not stored directly. Rather, for each column, a dictionary is created with all distinct values, and for each row, a reference to the corresponding value in the dictionary is stored. FIG. 6 illustrates the data structure from FIG. 1, but in a column store with dictionaries. The storage estimation of using a fixed string dictionary as described below is: 2×10 bytes for the city dictionary; 2×4 bytes for the revenue dictionary; 3×1 bits for the city column referencing the city dictionary (since only values 0 and 1 need to be stored, one bit is sufficient); and 3×1 bits for the revenue column. This yields a storage estimate of about 30 bytes, compared to 42 bytes for the traditional row-based storage. The savings increases for more rows.

However, data in the dictionary itself is still not compressed. This is not a problem for numbers, but some dictionaries, especially string dictionaries, can get quite large. Therefore, there are two special dictionary implementations for strings in HANA:

1) prefix-coded dictionary, in which common prefixes are removed. Example:

---

3 Terms: [ Wall, Wallclock, Walldorf]
Dictionary: [ Wall, (4, clock), (4, dorf) ]
The first entry in the dictionary is uncompressed (Wall)

---

The subsequent entries reference the preceding entry:
„04": take 4 characters from the preceding entry (Wall)
„clock": add „clock" -> „Wallclock"

---

2) fixed string dictionary, where each character is encoded with a minimum number of bits. For example, GUIDs or TIMESTAMP-like strings only need a small subset of ASCII (0-9, A-F). It would be a waste to use 8 bits per character, sometimes 2-4 bits are enough, ~0 bits are possible. This is described in further detail below.

Figure 7:
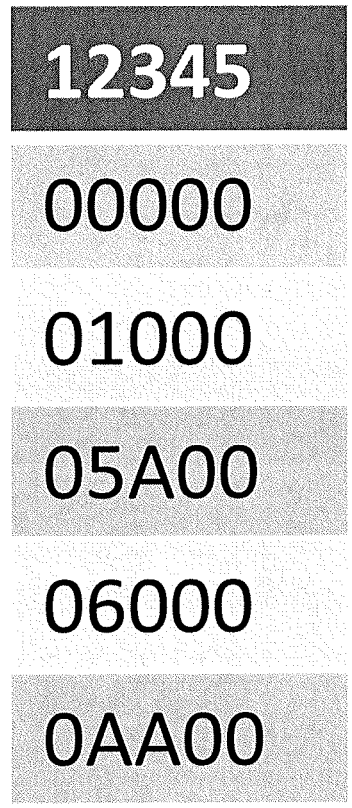
FIG. 7 illustrates a fixed string dictionary with several special properties.

FIG. 7 illustrates a fixed string dictionary, which has several special properties. Characters at position 1 are constant (0), and the prefix dictionary can compress those. Characters at the last two positions are also constant (0), however the prefix dictionary cannot compress those, but the fixed string dictionary can. Lastly, only a limited number of characters: e.g. [0, 1, 5, 6, A] can be at second position. The prefix dictionary needs 1 byte to encode, while the fixed string dictionary requires only 3 bits.

The terms in the fixed string dictionary are compressed in blocks, such as in 512 terms per block. For each block, there is a reference string (first string of the block). Characters that are constant among all the terms of the block are marked and not stored for terms 2 . . . 512 of the block (positions 1, 4, 5 in the example shown in FIG. 7). For all remaining character positions (2, 3), a separate dictionary is built. The non-constant characters of the remaining 511 terms in the block are coded according to these dictionaries. As an example:

---

Reference string: 00000
Bitvector denoting constant characters: [10011]
These characters do not need to be encoded for terms 2..5
Dictionary for character position 2: [0, 1, 5, 6, A]
5 possible values -> 3 bits are required to encode one character
Dictionary for character position 3: [0, A]
2 possible values -> 1 bit
Encoding non-constant characters of term 2 „01000":
Character „1": position 1 in dict, 3 bits -> bitstring 001
Character „0": position 0 in dict, 1 bit -> bitstring 0
-> 0010
Encoding term 3:
Character „5": position 2, bitstring 010
Character „A": position 1, bitstring 1
-> 0101

---

Figure 8:
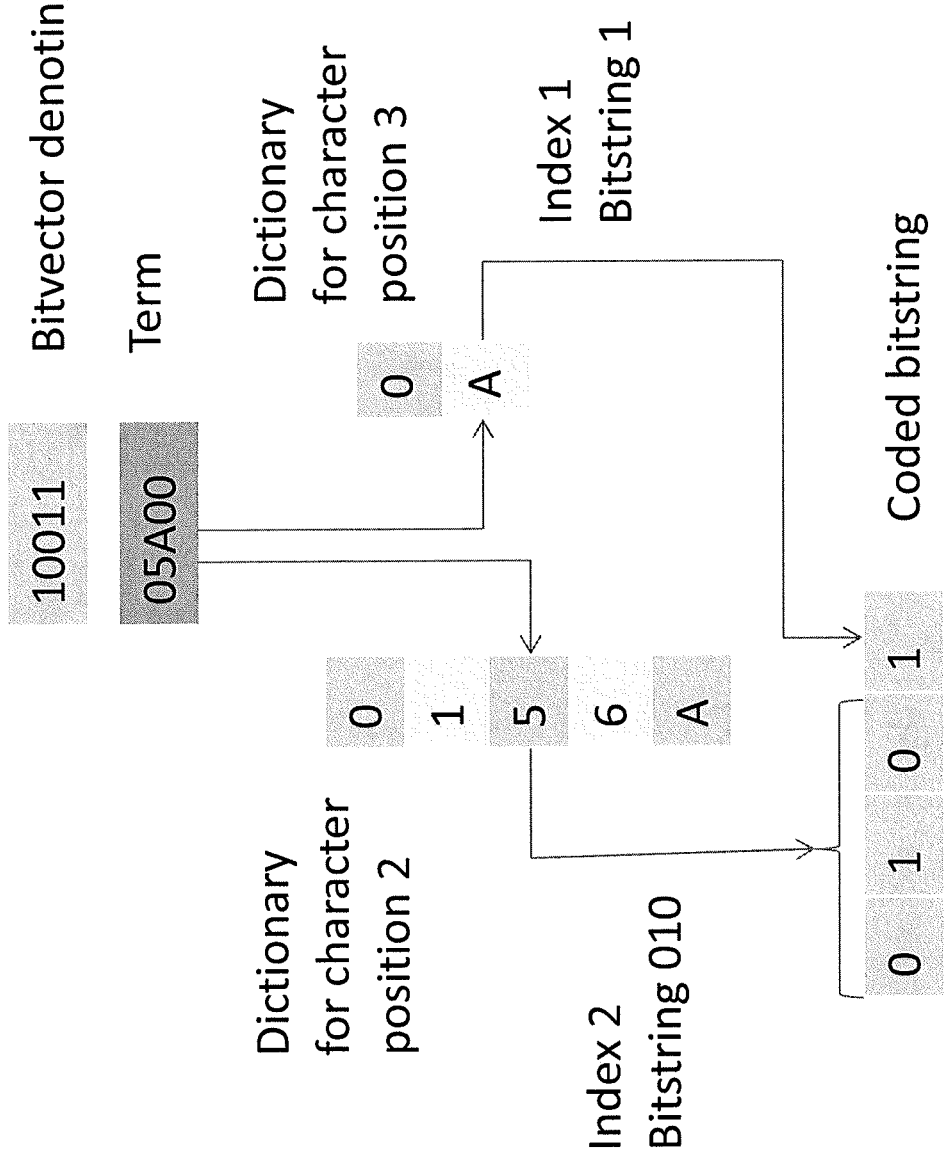
FIG. 8 illustrates term 3 encoding for the example shown in FIG. 7.

FIG. 8 illustrates term 3 encoding for the example shown in FIG. 7. If uncompressed, the storage required would be 25 bytes.

The use of a prefix-coded dictionary can save 4 bytes at most. However, the fixed string dictionary implementation uses only 17 bytes. Further, in typical use cases, such as GUIDs, Dates, material numbers, etc., the memory saved from using a fixed string dictionary can be twice as much as using a prefix-coded dictionary.

Figure 9:
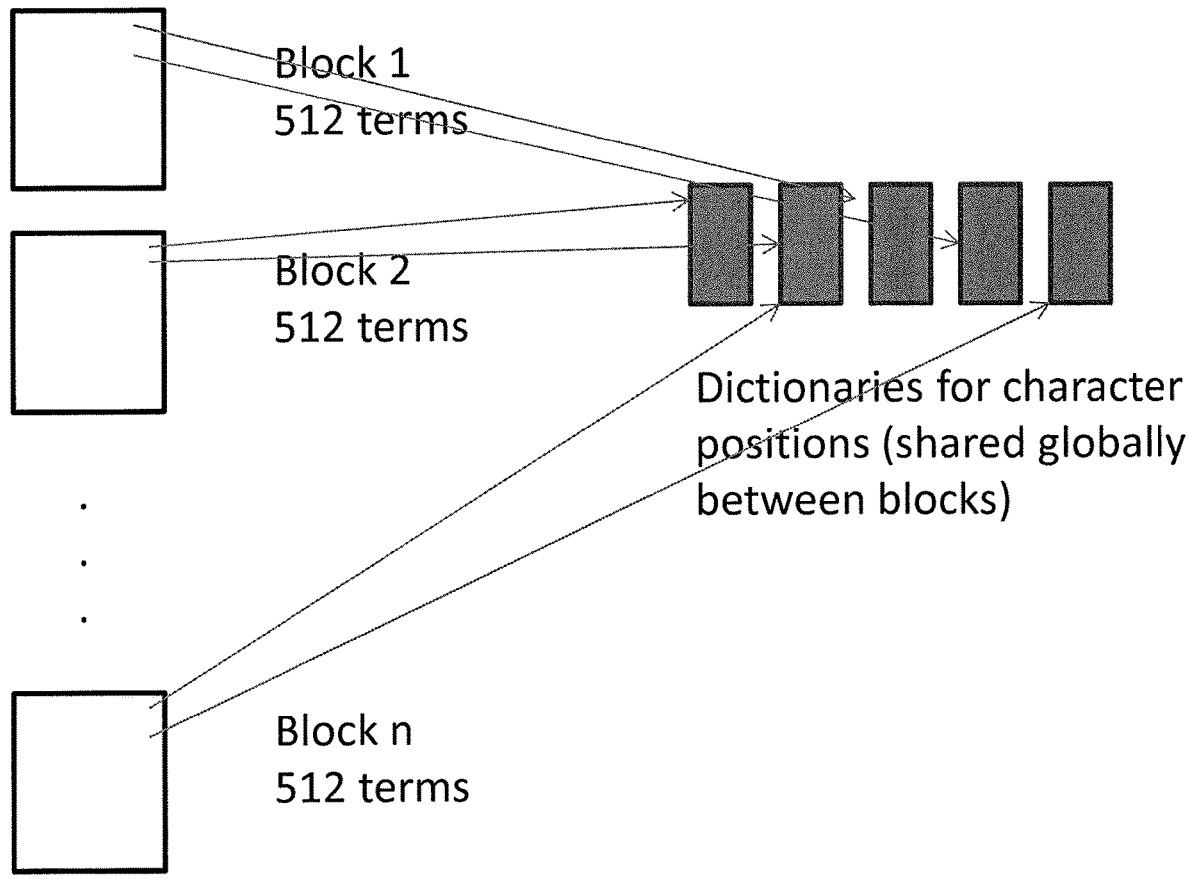
FIG. 9 illustrates another implementation of a fixed string dictionary.

FIG. 9 illustrates another implementation of a fixed string dictionary. The fixed string dictionary includes a reference term (the first term in the block), and a bitvector denoting characters positions identical in each term. These bitvectors can be retrieved from the reference term. A reference to a dictionary for all non-constant character positions is also used. The fixed string dictionary further includes bit array with the bitstrings of all coded terms, and only non-constant characters are coded.

The fixed string dictionary is well-suited for terms with constant length using only a subset of ASCII. Otherwise, storage and decompression overhead is too high and no memory savings will occur, and the prefix-coded dictionary should be used in these cases. Therefore, a wrapper exists for string-like attribute type that dynamically chooses the best dictionary depending on the data, which is called a central "StringDict." When a dictionary is constructed, the StringDict receives all terms. It analyzes them and builds either a prefix-coded or fixed string dictionary. If all terms are the same length, and all terms are only in the ASCII domain, and either only lower case or only upper case, then the fixed string dictionary should be chosen, otherwise, a prefix-coded dictionary should be used. Some advantages of the fixed string dictionary are that search performance is always constant, and memory savings is automatically independent of the data type used by the database, and only dependent on the data in the table.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

storing, by one or more processors, data in a memory structure organized in a column store format defined by a plurality of columns and a plurality of rows;

generating, by the one or more processors, a fixed string dictionary for each column in the memory structure and a prefix-coded dictionary, the fixed string dictionary having distinct values for each column, each value of the fixed string dictionary being represented by a plurality of characters occupying preset positions in the fixed string dictionary, each position having a different number of characters;

generating, by the one or more processors, a reference to the fixed string dictionary for each column in the memory structure;

storing, by the one or more processors, the fixed string dictionary and the reference to the fixed string dictionary in the memory structure;

compressing, by the one or more processors, a block of memory having a plurality of terms defined for each fixed string dictionary, the compressing comprising excluding storage of at least one character of the plurality of characters that is repeated in each row of at least one column that is specific to a corresponding at least one preset position in the block of memory, wherein a constant value in a first position of each row in each column is compressed using the prefix-coded dictionary in a first term of the plurality of terms, each non-constant value is compressed using a corresponding separately generated fixed string dictionary in remaining terms of the plurality of terms;

wherein the block comprises:
a reference term;
a bitvector representing a character position in each fixed string dictionary;
a reference to a fixed string dictionary for all non-repeating character positions; and
a bit array having bitstrings of all coded terms associated with non-repeating characters in a group of dictionaries;
and
building, by the one or more processors, a fixed string dictionary for all positions in the block other than the reference term.

2. The method in accordance with claim 1, wherein the compressing comprises excluding storage of each row within the at least one column that is specific to a corresponding preset position in the block of memory.

3. A computer program product comprising a non-transitory computer-readable storage medium storing instructions that, when executed by at least one programmable processor, cause the at least one programmable processor to perform operations comprising:
storing data in a memory structure organized in a column store format defined by a plurality of columns and a plurality of rows;
generating a fixed string dictionary for each column in the memory structure and a prefix-coded dictionary, the fixed string dictionary having distinct values for each column, at least one value of the fixed string dictionary being represented by a plurality of characters occupying preset positions in the fixed string dictionary, each position having a different number of characters;
generating a reference to the fixed string dictionary for each column in the memory structure;
storing the fixed string dictionary and the reference to the fixed string dictionary in the memory structure;
defining a block of memory defined for each fixed string dictionary having a plurality of terms;
excluding, for at least one fixed string dictionary, storage of at least one character of the plurality of characters that is repeated in each row of at least one column that is specific to a corresponding at least one preset position in the block of memory, wherein a constant value in a first position of each row in each column is stored using the prefix-coded dictionary in a first term of the plurality of terms, each non-constant value is stored using a corresponding separately generated fixed string dictionary in remaining terms of the plurality of terms;
wherein the block comprises:
a reference term;
a bitvector representing a character position in each fixed string dictionary;
a reference to a fixed string dictionary for all non-repeating character positions; and
a bit array having bitstrings of all coded terms associated with non-repeating characters in a group of dictionaries;
and
building a fixed string dictionary for all positions in the block other than the reference term.

4. The computer program product in accordance with claim 3, wherein the excluding of the at least one character that is repeated in each row of the at least one column is a part of a compression of the block of memory.

5. A system comprising:
at least one programmable processor; and
a machine-readable medium storing instructions that, when executed by the at least one processor, cause the at least one programmable processor to perform operations comprising:
store data in a memory structure organized in a column store format defined by a plurality of columns and a plurality of rows;
generate a fixed string dictionary for each column in the memory structure and a prefix-coded dictionary, the fixed string dictionary having distinct values for each column, each value of the fixed string dictionary being represented by a plurality of characters occupying preset positions in the fixed string dictionary, each position having a different number of characters;
generate a reference to the fixed string dictionary for each column in the memory structure;
store the fixed string dictionary and the reference to the fixed string dictionary in the memory structure;
compress a block of memory having a plurality of terms defined for each fixed string dictionary, the compressing comprising excluding storage of at least one character of the plurality of characters that is repeated in each row of at least one column that is specific to a corresponding at least one preset position in the block of memory, wherein a constant value in a first position of each row in each column is compressed using the prefix-coded dictionary in a first term of the plurality of terms, each non-constant value is compressed using a corresponding separately generated fixed string dictionary in remaining terms of the plurality of terms;
wherein the block comprises:
a reference term;
a bitvector representing a character position in each fixed string dictionary;
a reference to a fixed string dictionary for all non-repeating character positions; and
a bit array having bitstrings of all coded terms associated with non-repeating characters in a group of dictionaries;
and
build a fixed string dictionary for all positions in the block other than the reference term.

* * * * *